US010481394B2

(12) United States Patent
Kawana

(10) Patent No.: US 10,481,394 B2
(45) Date of Patent: Nov. 19, 2019

(54) HEAD UP DISPLAY APPARATUS

(71) Applicant: FUJIFILM Corporation, Tokyo (JP)

(72) Inventor: Masanao Kawana, Saitama (JP)

(73) Assignee: FUJIFILM Corporation, Tokyo (JP)

(*) Notice: Subject to any disclaimer, the term of this patent is extended or adjusted under 35 U.S.C. 154(b) by 30 days.

(21) Appl. No.: 15/385,182

(22) Filed: Dec. 20, 2016

(65) Prior Publication Data
US 2017/0199378 A1 Jul. 13, 2017

(30) Foreign Application Priority Data

Jan. 12, 2016 (JP) .................. 2016-003587

(51) Int. Cl.
G02B 27/01 (2006.01)
B60K 35/00 (2006.01)
G06T 19/00 (2011.01)

(52) U.S. Cl.
CPC .......... G02B 27/0101 (2013.01); B60K 35/00 (2013.01); G06T 19/006 (2013.01);
(Continued)

(58) Field of Classification Search
CPC ............. G02B 27/0018; G02B 27/01; G02B 27/0101; G02B 27/012; G02B 27/0141; G02B 27/0149; G02B 27/0154; G02B 27/0176; G02B 27/0179; G02B 2027/011; G02B 2027/0112; G02B 2027/0114; G02B 2027/0118; G02B 2027/0123; G02B 2027/0127; G02B 2027/014; G02B 2027/0141; G02B 2027/0154; G02B 2027/0159; G02B 2027/0181;
(Continued)

(56) References Cited

U.S. PATENT DOCUMENTS 9,030,749 B2 5/2015 Lescure et al.
2009/0009594 A1 1/2009 Kawai
(Continued)

FOREIGN PATENT DOCUMENTS

JP S64-044914 A 2/1989
JP 2009-015128 A 1/2009
(Continued)

OTHER PUBLICATIONS

An Office Action mailed by the Japanese Patent Office dated Jan. 29, 2019, which corresponds to Japanese Patent Application No. 2016-003587 and is related to U.S. Appl. No. 15/385,182.

*Primary Examiner* — Jie Lei
(74) *Attorney, Agent, or Firm* — Studebaker & Brackett PC

(57) ABSTRACT

An optical filter having spectral properties that reflects light of a first wavelength band and transmits light of a second wavelength band that does not include the first wavelength band is provided between a greater distance optical system that displays a virtual image at a greater distance from an image reflection surface and a closer distance optical system that displays a virtual image at a closer distance from the image reflection surface. The optical filter aligns the optical paths of display light of the greater distance optical system and the closer distance optical system and guides the display light to the image reflection surface. Further, the powers of the greater distance optical system and the closer distance optical system are set to be different.

9 Claims, 4 Drawing Sheets

(52) U.S. Cl.
CPC .. *B60K 2370/1529* (2019.05); *B60K 2370/23* (2019.05); *B60K 2370/25* (2019.05); *B60K 2370/31* (2019.05); *B60K 2370/333* (2019.05); *B60K 2370/334* (2019.05); *G02B 2027/0112* (2013.01); *G02B 2027/0114* (2013.01); *G02B 2027/0127* (2013.01); *G02B 2027/0141* (2013.01)

(58) Field of Classification Search
CPC .. G02B 2027/0187; G02B 26/10; G02B 5/20; G02B 5/26; G02B 5/289; G02B 6/00; G02B 6/0046; G02B 6/0066; G02B 6/0068; G02B 6/0073; G02B 23/10; G02B 5/0284; G02B 27/0172; G02B 27/017; G02B 5/02; G01C 21/265; G01C 21/365; G03B 21/60; G06T 19/00; G06T 19/006; G09G 2320/0626; B60K 35/00; B60K 37/04; B60K 2350/20; B60K 2350/2021; B60K 2350/2047; B60K 2350/2052; B60K 2350/2065; B60K 2350/40; B60K 2350/405; B60K 2350/406; B60K 2370/31; B60K 2370/333; B60K 2370/334; B60K 2370/25; B60K 2370/23; B60K 2370/1529; B60R 1/00; B60R 2300/00; B60R 2300/20; B60R 2300/205; B60Y 2400/92; Y10S 385/901; H04N 13/0418

USPC .... 359/13, 630, 631, 632, 634, 599; 353/30, 353/38; 345/204, 212, 7–9; 348/E9.025, 348/744; 349/7, 11; 340/461, 980; 362/543, 545, 612, 618

See application file for complete search history.

(56) References Cited

U.S. PATENT DOCUMENTS

| | | |
|---|---|---|
| 2013/0016522 A1 | 1/2013 | Baek et al. |
| 2013/0182320 A1 | 7/2013 | Silverstein |
| 2013/0242404 A1 | 9/2013 | Kobayashi |
| 2016/0178902 A1* | 6/2016 | Ando .................. B60K 35/00 348/115 |

FOREIGN PATENT DOCUMENTS

| | | | |
|---|---|---|---|
| JP | 2009-067333 A | 4/2009 | |
| JP | 2009067333 | * 4/2009 | ............ B60K 35/00 |
| JP | 2011-170185 A | 9/2011 | |
| JP | 4816605 B2 | 11/2011 | |
| JP | 2012-179935 A | 9/2012 | |
| JP | 2013-025308 A | 2/2013 | |
| JP | 2015-513685 A | 5/2015 | |

* cited by examiner

HEAD UP DISPLAY APPARATUS

CROSS REFERENCE TO RELATED APPLICATIONS

The present application claims priority under 35 U.S.C. § 119 to Japanese Patent Application No. 2016-003587 filed on Jan. 12, 2016. The above application is hereby expressly incorporated by reference in its entirety, into the present application.

BACKGROUND

The present disclosure is related to a head up display apparatus for use in vehicles such as automobiles.

Conventionally, head up display apparatuses are known as an apparatus that displays directional commands, warnings, traveling speed, etc. to drivers of automobiles and the like. These head up display apparatuses project virtual images of images to be displayed onto image reflection surfaces of windshields or combiners, etc., to enable drivers to discriminate information necessary to drive automobiles or the like, without averting their eyes from fields of view.

It is possible to display virtual images of information which is preferably displayed in the forward field of view of a driver from among information to be displayed by such a head up display apparatus, such as directional commands, warnings, etc., at greater distances from an image reflection surface. Thereby, movement of the line of sight and/or the focal point of the driver's eyes can be suppressed.

Inversely, it is possible to suppress movement of the line of sight and/or the focal point of the driver's eyes by displaying virtual images of information which is preferably displayed in the vicinity of the console of an automobile, such as traveling speed, at closer distances from the image reflection surface.

For this reason, Japanese Unexamined Patent Publication No. 2012-179935 and Japanese Patent No. 4816605 propose head up display apparatuses which are capable of displaying virtual images at a plurality of positions at different distances from an image reflection surface.

SUMMARY

In the above head up display apparatuses which are capable of displaying virtual images at a plurality of positions at different distances from an image reflection surface, there is demand for the difference in the distance between the virtual image to be displayed at a greater distance from the image reflection surface and the virtual image to be displayed at a closer distance from the image reflection surface to be as great as possible. For example, in recent head up display apparatuses for automobiles, it is desired to set the position of a virtual image to be displayed at a greater distance to approximately 10 meters from the image reflection surface, and to set the position of a virtual image to be displayed at a closer distance to approximately 2 meters from the image reflection surface.

With respect to this point, the apparatus of Japanese Unexamined Patent Publication No. 2012-179935 is of a configuration that provides a region for displaying a virtual image at a greater distance and a region for displaying a virtual image at a closer distance in a single image display element, employs a light sources that emit light of different wavelengths for each of the regions, and further is equipped with a separating film having wavelength selectivity on the surface of a concave mirror for magnifying and projecting display light output from the image display element onto the image reflection surface.

The front surface and the back surface of the concave mirror have different powers. The power during reflection is changed by causing display light for the greater distance virtual image display region and display light for the closer distance virtual image display region to be reflected by different surfaces of the concave mirror, to change the positions of the virtual images with respect to the image reflection surface.

However, it is difficult to change the shapes at the two surfaces because the front surface and the back surface of one concave mirror change the power in this configuration. In addition, the greater distance virtual image display region and the closer distance virtual image display region are provided within one image display element, and therefore the positional relationships between the concave mirror and each of the display regions cannot be changed independently. As a result, it is also difficult to impart differences in the optical path lengths of display light for the two regions. For this reason, there is a problem that it is difficult to set the difference in the distance between the virtual image to be displayed at a greater distance from the image reflection surface and the virtual image to be displayed at a closer distance from the image reflection surface to be great.

In addition, the apparatus of Japanese Patent No. 4816605 is equipped with an optical filter that reflects light of a certain wavelength band and transmits light of another wavelength band other than the certain wavelength band, provided between a greater distance optical system that displays a virtual image at a greater distance from the image reflection surface and a closer distance optical system that displays a virtual image at a closer distance from the image reflection surface. This optical filter aligns the optical paths of display light of the greater distance optical system and the closer distance optical system and guides the display light to the image reflection surface.

In the apparatus of Japanese Patent No. 4816605, the configurations of the greater distance optical system and the closer distance optical system are the same, and the positions of the virtual images from the image reflection surface are changed by setting the distances from the optical filter to each of the optical systems to be different.

However, there is a limit to the space within a vehicle such as an automobile in which a head up display apparatus can be installed. Therefore, the greater distance optical system cannot be placed at a great distance from the optical filter, and there is a problem that it is difficult to set the difference in the distance between the virtual image to be displayed at a greater distance from the image reflection surface and the virtual image to be displayed at a closer distance from the image reflection surface to be great.

The present disclosure has been developed in view of the foregoing circumstances. The present disclosure provides a head up display apparatus which is capable of setting the difference in the distance between the virtual image to be displayed at a greater distance from the image reflection surface and the virtual image to be displayed at a closer distance from the image reflection surface to be great.

A head up display apparatus of the present disclosure comprises:

an image reflection surface that faces an observer and reflects display light toward the observer;

a first image display element that outputs display light onto the image reflection surface;

a second image display element that outputs display light onto the image reflection surface;

images displayed by the first image display and the second display element being magnified and displayed beyond the image reflection surface as virtual images;

the head up display apparatus further comprising:

a greater distance optical system that displays a virtual image of the image displayed by the first image display element at a greater distance from the image reflection surface;

a closer distance optical system having a power different from that of the greater distance optical system that displays a virtual image of the image displayed by the second image display element at a closer distance from the image reflection surface; and an optical filter having spectral properties that reflects light of a first wavelength band and transmits light of a second wavelength band that does not include the first wavelength band;

the greater distance optical system and the closer distance optical system being arranged to have the optical filter interposed therebetween.

Here, the expressions "greater distance" and "closer distance" do not indicate specific distances, but represent positions of the virtual images form the image reflection surface in a relative manner.

In addition, the expression "spectral properties that reflects light of a first wavelength band and transmits light of a second wavelength band that does not include the first wavelength band" means that the reflectance of the first wavelength band is at least 50% and the transmissivity of the second wavelength band is at least 50%.

In the head up display apparatus of the present disclosure, it is preferable for the optical filter to be a light transmissive plane parallel plate shaped substrate having a filter layer having the aforementioned spectral properties formed on at least one surface thereof.

In addition, it is preferable for the optical filter to be a light transmissive substrate having a filter layer having the aforementioned spectral properties formed on one surface thereof, and for the filter layer to face an optical system, which is either the greater distance optical system or the closer distance optical system, for which display light is reflected.

In addition, the head up display apparatus of the present disclosure may be configured such that the display light output from the greater distance optical system passes through the optical filter and the display light output from the closer distance optical system is reflected by the optical filter, or may be configured such that the display light output from the greater distance optical system is reflected by the optical filter and the display light output from the closer distance optical system passes through the optical filter.

In addition, it is preferable for the above spectral properties to be those in which wavelength bands for each of R (Red), G (Green), and B (Blue) are divided into a plurality of sub wavelength bands, a wavelength band constituted by a combination of portions of each of the RGB sub wavelength bands is designated as a first RGB band, a wavelength band constituted by a combination of portions of sub wavelength bands different from the first RGB band is designated as a second RGB band, and one of the first RGB band and the second RGB band is reflected and the other is transmitted.

At this time, it is preferable for the first RGB band to include sub wavelength bands most toward the short wavelength side within each of the RGB wavelength bands, for the first RGB band to be assigned to the optical path of the display light which is output from the greater distance optical system, and for the second RGB band to be assigned to the optical path of the display light which is output from the closer distance optical system.

In addition, the light source of the first image display element and/or the light source of the second image display element may be constituted by an LED (Light Emitting Diode), may be constituted by a laser, or may be constituted by a combination of an LED and a laser.

The head up display apparatus of the present disclosure is provided with the greater distance optical system that displays a virtual image at a greater distance from the image reflection surface; the closer distance optical system that displays a virtual image at a closer distance from the image reflection surface; and the optical filter having spectral properties that reflects light of a first wavelength band and transmits light of a second wavelength band that does not include the first wavelength band provided between the greater distance optical system and the closer distance optical system. The head up display apparatus of the present disclosure of a configuration in which the optical filter aligns and guides the display light of the greater distance optical system and the display light of the closer distance optical system to the image reflection surface. Further, the powers of the greater distance optical system and the closer distance optical system are different. Therefore, it is possible for the difference in the distance between the virtual image to be displayed at a greater distance from the image reflection surface and the virtual image to be displayed at a closer distance from the image reflection surface to be great.

DETAILED DESCRIPTION OF THE PREFERRED EMBODIMENTS

Figure 1:
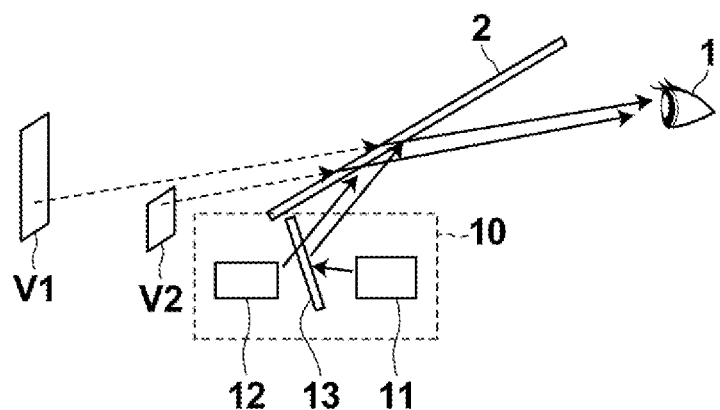
FIG. 1 is a schematic diagram that illustrates the driver's seat of an automobile in which a head up display apparatus according to an embodiment of the present disclosure is mounted.
Figure 2:
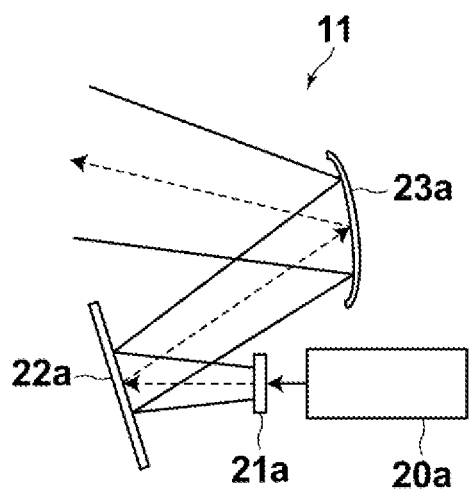
FIG. 2 is a schematic diagram that illustrates the configuration of a greater distance optical system of the head up display apparatus of FIG. 1.
Figure 3:
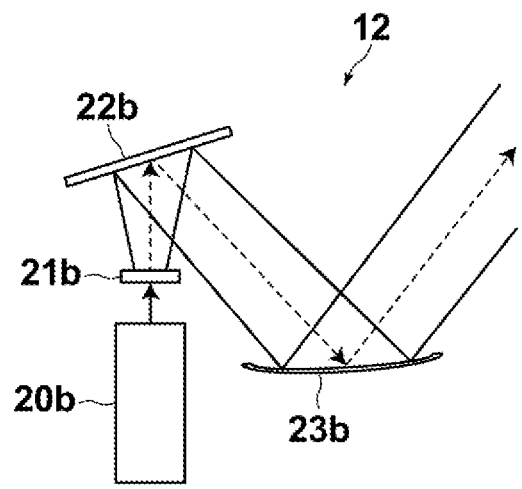
FIG. 3 is a schematic diagram that illustrates the configuration of a closer distance optical system of the head up display apparatus of FIG. 1.
Figure 4:
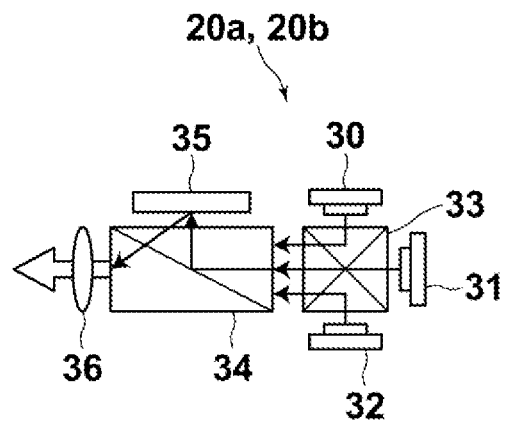
FIG. 4 is a schematic diagram that illustrates the configuration of a projection unit of the head up display apparatus of FIG. 1.
Figure 5:
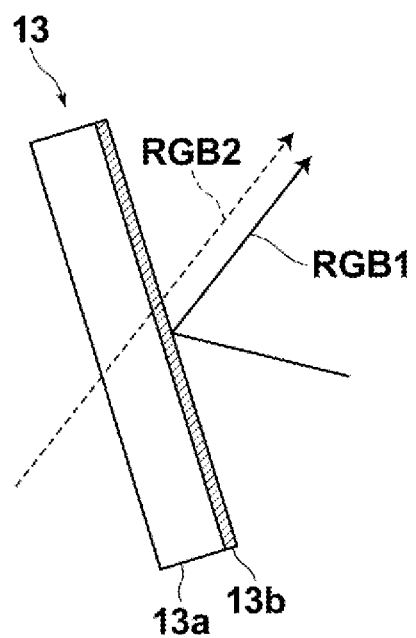
FIG. 5 is a schematic diagram that illustrates the configuration of an optical filter of the head up display apparatus of FIG. 1.

Hereinafter, an embodiment of the present disclosure will be described in detail with reference to the attached drawings. FIG. 1 is a schematic diagram that illustrates the driver's seat of an automobile in which a head up display apparatus according to an embodiment of the present disclosure is mounted. FIG. 2 is a schematic diagram that illustrates the configuration of a greater distance optical system of the head up display apparatus. FIG. 3 is a schematic diagram that illustrates the configuration of a closer distance optical system of the head up display apparatus. FIG. 4 is a schematic diagram that illustrates the configuration of a projection unit of the head up display apparatus. FIG. 5 is a schematic diagram that illustrates the configuration of an optical filter of the head up display apparatus.

As illustrated in FIG. 1, the head up display apparatus 10 of the present embodiment causes display light from a first image display element and a second image display element to be reflected toward a driver (observer) 1 by a front windshield (image reflection surface) 2 that faces the driver 1, magnifies and displays an image displayed by the first image display element as a virtual image V1 through the front windshield 2, and magnifies and displays an image displayed by the second image display element as a virtual image V2 through the front windshield 2.

This head up display apparatus 10 is equipped with: a greater distance optical system 11 that displays the virtual image V1 displayed by the first image display element at a greater distance from the front windshield 2; a closer distance optical system 12 having a power different from that of the greater distance optical system 11 that displays the virtual image V2 displayed by the second image display element at a closer distance from the front windshield 2; and an optical filter 13 that reflects light within a first wavelength band and transmits light within a second wavelength band that does not include the first wavelength band. The greater distance optical system 11 and the closer distance optical system 12 are provided such that the optical filter 13 is interposed therebetween.

As illustrated in FIG. 2, the greater distance optical system 11 is constituted by: a projection unit 20a equipped with the first image display element; a diffuser 21a that projects display light which is output from the projection unit 20a; a planar mirror 22a that reflects the display light which is output from the diffuser 21a toward a concave mirror 23a to be described later; and the concave mirror 23a that reflects the display light which has reached the concave mirror 23a from the planar mirror 22a toward the optical filter 13.

As illustrated in FIG. 3, the greater distance optical system 12 is constituted by: a projection unit 20b equipped with the second image display element; a diffuser 21b that projects display light which is output from the projection unit 20b; a planar mirror 22b that reflects the display light which is output from the diffuser 21b toward a concave mirror 23b to be described later; and the concave mirror 23b that reflects the display light which has reached the concave mirror 23b from the planar mirror 22b toward the optical filter 13.

The greater distance optical system 11 and the closer distance optical system 12 are optimized for their respective projection distances. In the case that a virtual image is to be displayed at a greater distance from the front windshield 2, that is, in the case that the projection distance of an optical system is to be set greater, a stronger power is necessary in the optical system. Therefore, the concave mirror 23a of the greater distance optical system 11 is configured to have a power greater than that of the concave mirror 23b of the closer distance optical system 12. Thereby, the virtual image V1 of the image which is displayed by the first image display element (greater distance image) is displayed at a greater distance from the front windshield 2 compared to the virtual image V2 of the image which is displayed by the second image display element (closer distance image).

In this manner, in the greater distance optical system 11 and the closer distance optical system 12, virtual images are displayed by optical systems which are optimized to necessary projection distances, including the powers and arrangements of the concave mirrors. Therefore, the degree of freedom in setting the projection distances (virtual image positions) can be increased.

In addition, in the case that the virtual images V1 and V2 are projected without passing through the diffusers 21a and 21b, the resolutions of the virtual images V1 and V2 will increase. However, the ranges of the pupil positions in which the virtual images V1 and V2 can be discriminated will be extremely narrow. Therefore, there is a possibility that visibility will decrease when the head of the driver 1 moves with respect to the front windshield 2. By projecting the virtual images V1 and V2 through diffusing members such as the diffusers 21a and 21b, the range of pupil positions in which the virtual images V1 and V2 can be discriminated can be expanded.

Note that the greater distance optical system 11 and the closer distance optical system 11 of the present embodiment are each constituted by one planar mirror and one concave mirror. However, the numbers and types of mirrors are not limited to these configurations, and various configurations are possible. For example, concave mirrors for correcting aberrations may be added to the above configurations, or the optical systems may each be constituted by one or a plurality of concave mirrors.

The configurations of the projection unit 20a of the greater distance optical system 11 and the projection unit 20b of the closer distance optical system 12 are the same. As illustrated in FIG. 4, the projection units 20a and 20b are constituted by: a red (R) LED light source 30, a green (G) LED light source 31, a blue (B) LED light source 32; a dichroic prism 33 that combines light output by these light sources; a DMD (Digital Micromirror Device) element 35 that functions as the image display element; a TIR (Total Internal Reflection) prism 36 that guides RGB light output from the dichroic prism 33 to the DMD element 35 and guides the display light reflected by the DMD element 35 to a lens 36 to be described later: and the lens 36 that projects the display light output from the TIR prism 34 to the diffuser 21a or the diffuser 21b.

Here, the DMD element 35 within the projection unit 20a of the greater distance optical system 11 corresponds to the first image display element, and the DMD element 35 within the projection unit 20b of the closer distance optical system 12 corresponds to the second image display element.

As described above, the light sources for the DMD element 35 are constituted by LED's which have favorable response properties with respect to ON/OFF operations, and therefore the light sources can be controlled at high speed.

Note that the configurations of the projection units 20a and 20b are not limited to that described above, and various configurations may be adopted. For example, a dichroic mirror, a color wheel, or the like may be employed instead of the dichroic prism. In addition, laser light sources, light bulbs, or the like may be employed instead of the LED light sources. Further, transmissive or reflective liquid crystals, MEMS (Micro Electro Mechanical System) mirrors, or the like may be employed instead of the DMD elements.

As illustrated in FIG. 5, the optical filter 13 is a plane parallel plate shaped light transmissive substrate 13a having a filter layer 13b with predetermined spectral properties formed on one surface thereof. It is necessary to form a photonic crystal structure that employs a dielectric multiple layer film or cholesteric crystals on the interface between the filter layer and the substrate, in order to form the filter layer having the predetermined spectral properties. Therefore, there will be a problem from the viewpoint of productivity in the case that the surface on which the filter layer is formed is a curved surface. For this reason, the surface on which the filter layer is formed is a planar surface, and productivity of the manufactured product is improved, by separating the functions of the powers of the optical systems and the filter.

Note that an optically functioning layer, such as an antireflection layer and/or a filter layer having spectral properties different from those of the filter layer 13b may be formed on the surface opposite the surface of the plane parallel plate shaped light transmissive substrate 13a on which the filter layer 13b is formed.

The above spectral properties are those in which wavelength bands for each of R (Red), G (Green), and B (Blue) are divided into a plurality of sub wavelength bands, a wavelength band constituted by a combination of portions of each of the RGB sub wavelength bands is designated as a first RGB band, a wavelength band constituted by a combination of portions of sub wavelength bands different from the first RGB band is designated as a second RGB band, and one of the first RGB band and the second RGB band is reflected and the other is transmitted.

By having such properties, wavelength bands for the three primary colors RGB can be assigned to both the greater distance optical system 11 and the closer distance optical system 12. Therefore, full color display is enabled for both the virtual image V1 displayed by the greater distance optical system 11 and the virtual image V2 displayed by the closer distance optical system 12.

Figure 6:
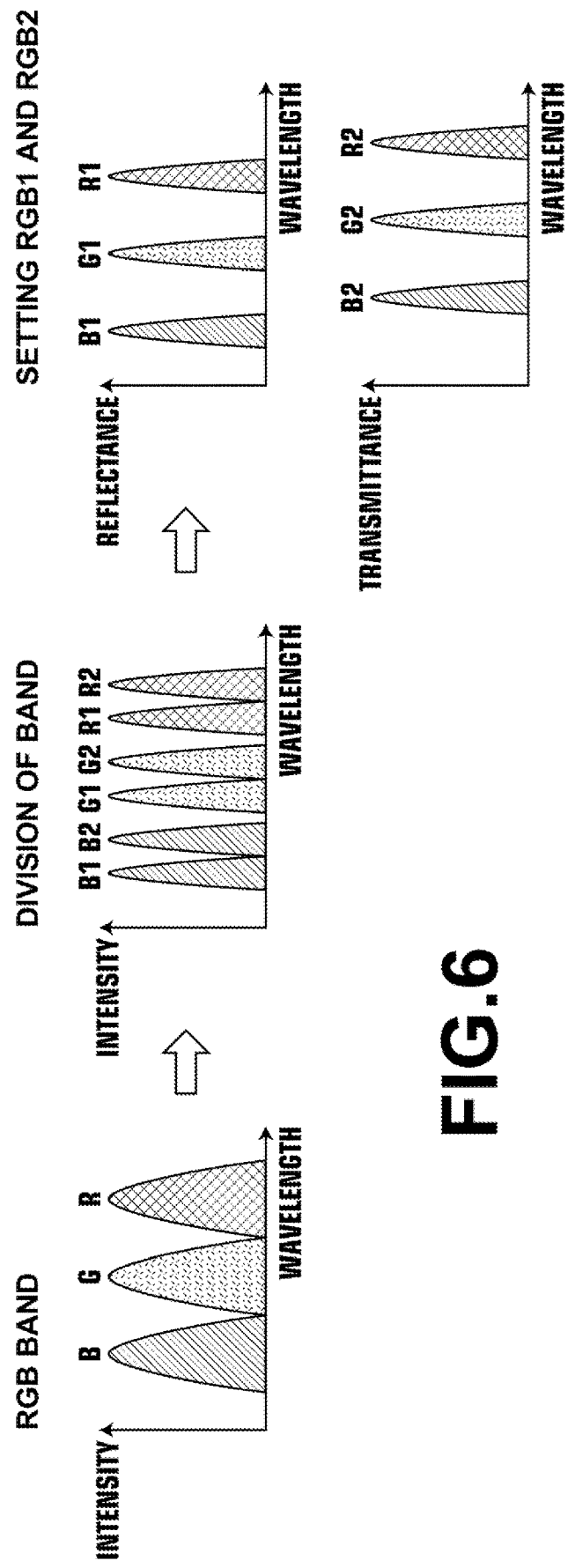
FIG. 6 is a diagram for explaining the spectral properties of the optical filter of the head up display apparatus of FIG. 1.

Here, the spectral properties of the filter layer 13b of the present embodiment will be described in detail. FIG. 6 is a diagram for explaining the spectral properties of the optical filter of the head up display apparatus.

As illustrated in FIG. 6, the spectral properties of the filter layer 13b of the present embodiment are those in which each of the RGB wavelength bands is divided into two sub wavelength bands, a wavelength band constituted by a combination of sub wavelength bands toward the short wavelength side within each of the RGB wavelength bands (a combination of R1, G1, and B1 in FIG. 6) is designated as a first RBG band (RGB1), and a wavelength band constituted by a combination of sub wavelength bands toward the long wavelength side within each of the RGB wavelength bands (a combination of R2, G2, and B2 in FIG. 6) is designated as a second RGB band (RGB2). As illustrated in FIG. 5, the first RGB band (RGB1) is reflected by the filter layer 13b, and the second RGB band (RGB2) passes through the filter layer 13b. In addition, the first RGB band (RGB1) is assigned to the optical path of the display light output from the greater distance optical system 11, and the second RGB band (RGB2) is assigned to the optical path of the display light output from the closer distance optical system 12.

Specifically, the red (R) wavelength band from 610 nm to 750 nm is divided into two sub wavelength bands from 610 nm to 680 nm (R1) and from 680 nm to 750 nm (R2), the green (G) wavelength band from 500 nm to 560 nm is divided into two sub wavelength bands from 500 nm to 530 nm (G1) and from 530 nm to 560 nm (G2), and the blue (B) wavelength band from 430 nm to 480 nm is divided into two sub wavelength bands from 430 nm to 455 nm (B1) and from 455 nm to 480 nm (B2). A wavelength band constituted by the combination of sub wavelength bands toward the short wavelength side within each of the RGB wavelength bands (the combination of R1, G1, and B1) is designated as the first RBG band (RGB1), and a wavelength band constituted by the combination of sub wavelength bands toward the long wavelength side within each of the RGB wavelength bands (the combination of R2, G2, and B2) is designated as the second RGB band (RGB2).

In this manner, the first RGB band (RGB1), which is a combination of sub wavelength bands toward the short wavelength side within each of the RGB wavelength bands, is assigned to the optical path of the display light output from the greater distance optical system 11, and the second RGB band (RGB2), which is a combination of sub wavelength bands toward the long wavelength side within each of the RGB wavelength bands, is assigned to the optical path of the display light output from the closer distance optical system 12. Thereby, the virtual image V1 which is displayed by the greater distance optical system 11 will be displayed with retreating colors, while the V2 which is displayed by the closer distance optical system 12 will be displayed with advancing colors. Therefore, the properties of retreating colors and advancing colors can emphasize the sense of perspective.

As illustrated in FIG. 1 and FIG. 5, the filter layer 13b of the optical filter 13 in the head up display apparatus 10 faces the optical system which reflects display light (the greater distance optical system 11 in the present embodiment).

By adopting such a configuration, the display light which is output from the optical system at the reflection side will not unnecessarily enter the interior of the light transmissive substrate 13a. Therefore, entry of the display light into surfaces that contact air other than the filter layer 13b and attenuation due to absorption in the interior of the light transmissive substrate 13a can be avoided. Accordingly, deterioration of spectral transmittance can be suppressed.

In addition, the head up display apparatus 10 is configured such that the display light which is output by the greater distance optical system 11 is reflected by the optical filter 13 and the display light which is output by the closer distance optical system 12 passes through the optical filter 13. In a head up display apparatus for an automobile, it is often the case that information such as directional commands, warnings, etc. which is preferably displayed in the forward field of view of a driver, that is, the virtual image V1 which is displayed at a greater distance from the front windshield 2, is assigned to the upper field of view, where background luminance is comparatively high. For this reason, deterioration in spectral transmittance of the greater distance optical system 11 can be suppressed, and a bright virtual image can be displayed by adopting the configuration described above. Therefore, the visibility of the virtual image can be improved.

Next, the operation of the head up display apparatus configured as described above will be described.

Display light which is output by the greater distance optical system 11 is reflected by the optical filter 13, and display light which is output by the closer distance optical system 12 passes through the optical filter 13. Thereby, the optical paths of the two display lights are aligned and guided to the front windshield 2.

The display light from the first image display element (for the greater distance) and the display light from the second image display element (for the closer distance) are reflected toward the driver 1, and images displayed by the first image display element (for the greater distance) and the second image display element (for the closer distance) are magnified and displayed through the front windshield 2 as virtual images V1 and V2.

Figure 7:
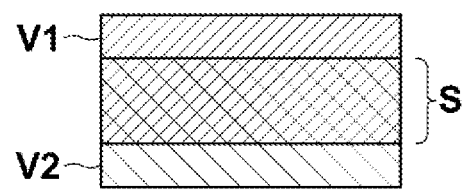
FIG. 7 is a diagram that illustrates the manner in which virtual images are displayed by the head up display apparatus of FIG. 1.
Figure 8:
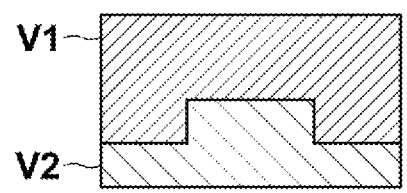
FIG. 8 is a diagram that illustrates another manner in which virtual images are displayed by the head up display apparatus of FIG. 1.
Figure 9:
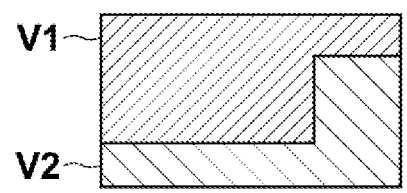
FIG. 9 is a diagram that illustrates still another manner in which virtual images are displayed by the head up display apparatus of FIG. 1.

The manner in which the virtual images V1 and V2 are displayed is illustrated in FIG. 7. In the head up display apparatus 10 of the present embodiment, the greater distance optical system 11 and the closer distance optical system 12 are provided with the optical filter 13 interposed therebetween, and the display light output from the two optical systems can be overlapped by the optical filter 13. Therefore, an overlapping region S can be provided for the virtual image V1 displayed at a greater distance and the virtual image V2 displayed at a closer distance, as illustrated in FIG. 7. In addition, it is also possible to display the two virtual images V1 and V2 such that they do not overlap, even within an overlapping region, by setting the displayed shapes of the virtual images V1 and V2 to be shapes other than rectangular, as illustrated in FIG. 8 and FIG. 9.

As described above, the head up display apparatus 10 of the present embodiment is capable of simultaneously displaying two virtual images having different display distances, displaying the virtual images in an overlapped manner, and changing the shapes of each of the virtual images. Therefore, it will become possible to freely compose screens by selecting images to be displayed in each region from both the greater distance and the closer distance as desired.

In addition, in the greater distance optical system 11 and the closer distance optical system 12, virtual images are displayed by optical systems which are optimized to necessary projection distances, including the powers and arrangements of the concave mirrors. Therefore, the degree of freedom in setting the projection distances (virtual image positions) can be increased.

An embodiment of the present disclosure has been described above. However, the present disclosure is not limited to the above embodiment, and various modifications are possible.

For example, the display light which is output by the greater distance optical system 11 is reflected by the optical filter 13 and the display light which is output by the closer distance optical system 12 passes through the optical filter 13 in the above embodiment. Alternatively, a configuration may be adopted in which the display light which is output by the greater distance optical system 11 passes through the optical filter 13 and the display light which is output by the closer distance optical system 12 is reflected by the optical filter 13.

It is necessary to secure space for the optical paths of the two display lights that propagates from the optical filter 13 to the front windshield 2 at the reflection side of the optical filter 13. Therefore, the entirety of the apparatus can be miniaturized by providing the greater distance optical system 11, of which a wide angle of view field is required and has a tendency to become large, at the transmissive side of the optical filter 13 as described above.

In addition, with respect to the light sources of the projection units 20a and 20b of the greater distance optical system 11 and the closer distance optical system 12, lasers having sharp spectral peaks may be employed. In this case, the color range can be expanded in addition to high speed control of the light sources. In addition, the light sources are not limited to those which are constituted only by LED's or only by lasers, but combinations of LED's and lasers may alternatively be employed. In addition, the light sources for each of the primary colors may be constituted by a plurality of light sources having different wavelengths.

In addition, it is also possible to configure the greater distance optical system 11 and the closer distance optical system 12 to utilize organic EL (Electro Luminescence), direct view type liquid crystals, or VFD (Vacuum Fluorescent Display) tubes instead of the projection units 20a and 20b and the diffusers 21a and 21b.

In addition, the properties of the optical filter 13 are not limited to those described above, and various other properties are possible.

For example, the purpose of providing the optical filter 13 is to match the optical path of the display light which is output from the greater distance optical system 11 and the optical path of the display light which is output from the closer distance optical system 12. Therefore, it is not necessary to cover the entire region of the optical paths with the filter layer. As an example, it is possible to configure the optical filter 13 such that the filter layer is not provided within a range of the transmissive side optical system in which the virtual images do not overlap.

In addition, the spectral properties described above are only one example. The properties of the optical filter may be simplified and a simple configuration in which color display is restricted is also possible. As another example, green wavelengths may be reflected while red wavelengths toward the long wavelength side and blue wavelengths toward the short wavelength side may be transmitted, to display color combinations of green and red, green and blue, or green and magenta at greater and closer distances. As a further alternative, only portions of singe wavelengths may be transmitted and other wavelengths may be reflected for the three primary colors, or only portions of singe wavelengths may be reflected and other wavelengths may be transmitted for the three primary colors, to display combinations of single colors and full colors.

Note that in the case that the number of primary colors which are used to display the virtual images are decreased in the above manner, the number of light sources for the projection units 20a and 20b can be reduced. Therefore, the configurations of the projection units 20a and 20b can be simplified.

What is claimed is:
1. A head up display apparatus, comprising:
an image reflection surface that faces an observer and reflects display light toward the observer;
a first image display element that outputs display light onto the image reflection surface;
a second image display element that outputs display light onto the image reflection surface;
images displayed by the first image display and the second display element being magnified and displayed beyond the image reflection surface as virtual images;
the head up display apparatus further comprising:
a greater distance optical system that displays a virtual image of the image displayed by the first image display element at a greater distance from the image reflection surface;
a closer distance optical system having a power different from that of the greater distance optical system that displays a virtual image of the image displayed by the second image display element at a closer distance from the image reflection surface; and
an optical filter having spectral properties that reflects light of a first wavelength band and transmits light of a second wavelength band that does not include the first wavelength band, the greater distance optical system and the closer distance optical system being arranged to have the optical filter interposed therebetween, the spectral properties being those in which wavelength bands for each of R (red), G (green), and B (blue) are divided into a plurality of sub wavelength bands, a wavelength band constituted by a combination of portions of each of the R, G and B sub wavelength bands is designated as a first RGB band, a wavelength band constituted by a combination of portions of sub wavelength bands different from the first RGB band is designated as a second RGB band, and one of the first RGB band and the second RGB band is reflected and the other is transmitted by the optical filter.

2. The head up display apparatus as defined in claim 1, wherein:

the optical filter is a light transmissive plane parallel plate shaped substrate having a filter layer having said spectral properties formed on at least one surface thereof.

3. The head up display apparatus as defined in claim 1, wherein:

the optical filter is a light transmissive substrate having a filter layer having said spectral properties formed on one surface thereof; and the filter layer faces an optical system, which is either the greater distance optical system or the closer distance optical system, for which display light is reflected.

4. The head up display apparatus as defined in claim 1, wherein:

the display light output from the greater distance optical system passes through the optical filter and the display light output from the closer distance optical system is reflected by the optical filter.

5. The head up display apparatus as defined in claim 1, wherein:

the display light output from the greater distance optical system is reflected by the optical filter and the display light output from the closer distance optical system passes through the optical filter.

6. The head up display apparatus as defined in claim 1, wherein:

the first RGB band includes sub wavelength bands most toward the short wavelength side within each of the R, G and B wavelength bands;

the first RGB band is assigned to the optical path of the display light which is output from the greater distance optical system; and the second RGB band is assigned to the optical path of the display light which is output from the closer distance optical system.

7. The head up display apparatus as defined in claim 1, wherein:

a light source of the first image display element and/or a light source of the second image display element is constituted by a light emitting diode.

8. The head up display apparatus as defined in claim 1, wherein:

a light source of the first image display element and/or a light source of the second image display element is constituted by a laser.

9. The head up display apparatus as defined in claim 1, wherein:

a light source of the first image display element and/or a light source of the second image display element is constituted by a combination of a light emitting diode and a laser.

* * * * *